(12) United States Patent
Schroeder et al.

(10) Patent No.: US 8,523,244 B2
(45) Date of Patent: Sep. 3, 2013

(54) BLOCK FITTING AND SEAL STRUCTURE

(75) Inventors: Fred Georg Schroeder, Grosse Ile, MI (US); Joseph Nader, Port Sanilac, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 13/334,877

(22) Filed: Dec. 22, 2011

(65) Prior Publication Data

US 2012/0091708 A1 Apr. 19, 2012

Related U.S. Application Data

(63) Continuation of application No. 12/577,338, filed on Oct. 12, 2009, now Pat. No. 8,104,773, which is a continuation of application No. 11/410,685, filed on Apr. 25, 2006, now Pat. No. 7,621,568.

(51) Int. Cl.
*F16L 17/00* (2006.01)
(52) U.S. Cl.
USPC ............................ 285/336; 285/208; 285/205
(58) Field of Classification Search
USPC .............. 285/328, 205, 336, 349, 378, 124.3, 285/124.2
See application file for complete search history.

(56) References Cited

U.S. PATENT DOCUMENTS

| | | |
|---|---|---|
| 2,898,167 A | 8/1959 | Tanner |
| 2,900,199 A | 8/1959 | Logan |
| 3,078,110 A | 2/1963 | Starr |
| 3,110,471 A | 11/1963 | Kuhles |
| 3,180,650 A | 4/1965 | Llebig |
| 3,215,166 A | 11/1965 | Meinecke |
| 3,302,953 A | 2/1967 | Glasgow |
| 3,367,682 A | 2/1968 | Meriano |
| 3,727,926 A | 4/1973 | Berry |
| 3,775,832 A | 12/1973 | Werra |
| 3,857,574 A | 12/1974 | Artzer |
| 4,119,335 A | 10/1978 | Rieffle et al. |
| 4,225,161 A | 9/1980 | Smith |
| 4,361,331 A | 11/1982 | Kohler |
| 4,475,031 A | 10/1984 | Mockovciak, Jr. |
| 4,548,429 A | 10/1985 | Merz |
| 4,579,354 A | 4/1986 | Vassallo et al. |
| 4,735,445 A | 4/1988 | Maler |
| 4,799,903 A | 1/1989 | Deurloo |
| 4,817,993 A | 4/1989 | Zoboli |
| 4,850,600 A | 7/1989 | Kaetscher et al. |
| 5,089,764 A | 2/1992 | Bobier et al. |
| 5,145,219 A | 9/1992 | Babuder |
| 5,228,925 A | 7/1993 | Nath et al. |
| 5,233,227 A | 8/1993 | Kajimoto et al. |
| 5,407,214 A | 4/1995 | Lew et al. |
| 5,421,594 A | 6/1995 | Becerra |
| 5,511,797 A | 4/1996 | Nikirk et al. |
| 5,518,257 A | 5/1996 | Breaker |
| 5,602,457 A | 2/1997 | Anderson et al. |
| 5,727,304 A | 3/1998 | Eybergen |
| 5,898,932 A | 4/1999 | Zurlo et al. |

(Continued)

*Primary Examiner* — Aaron Dunwoody
(74) *Attorney, Agent, or Firm* — Fraser Clemens Martin & Miller LLC; J. Douglas Miller

(57) ABSTRACT

An air conditioner system fitting is disclosed including a first seal portion comprising a metal material adapted to provide a primary seal, and a second seal portion attached to a free edge of said first seal portion and adapted to provide a secondary seal, wherein the fitting militates against leakage during operation of the air conditioning system.

20 Claims, 4 Drawing Sheets

(56) References Cited

U.S. PATENT DOCUMENTS

| | | |
|---|---|---|
| 6,039,319 A | 3/2000 | Coonce et al. |
| 6,076,834 A | 6/2000 | Jornhagen |
| 6,260,851 B1 | 7/2001 | Baron |
| 6,260,854 B1 | 7/2001 | Lemon |
| 6,318,766 B1 | 11/2001 | Babuder et al. |
| 6,318,768 B1 | 11/2001 | Gehres |
| 6,328,351 B1 | 12/2001 | Kato et al. |
| 6,367,803 B1 | 4/2002 | Loth |
| 6,386,593 B1 | 5/2002 | Slais et al. |
| 6,402,159 B1 | 6/2002 | Kohn |
| 6,460,859 B1 | 10/2002 | Hammi et al. |
| 6,581,941 B2 | 6/2003 | Carr |
| 6,676,167 B2 | 1/2004 | Schroeder et al. |
| 6,692,130 B1 | 2/2004 | Snow |
| 6,776,421 B2 | 8/2004 | Florence et al. |
| 6,811,159 B2 | 11/2004 | Kerchner |
| 6,834,893 B2 | 12/2004 | Schroeder et al. |
| 6,843,483 B2 | 1/2005 | Clark |
| 6,857,638 B2 | 2/2005 | Dupont et al. |
| 6,869,107 B2 | 3/2005 | Schroeder et al. |
| 6,893,052 B2 | 5/2005 | Wildermuth et al. |
| 6,896,298 B2 | 5/2005 | Walterscheid et al. |
| 6,908,117 B1 | 6/2005 | Pickett, Jr. et al. |
| 6,969,094 B2 | 11/2005 | Frohling et al. |
| 7,140,618 B2 | 11/2006 | Valls, Jr. |
| 7,159,906 B1 | 1/2007 | Vaudreuil et al. |
| 7,401,792 B2 | 7/2008 | Smirra |
| 7,407,165 B1 | 8/2008 | Chisnell |
| 7,564,212 B2 | 7/2009 | Li et al. |
| 7,703,773 B2 | 4/2010 | Putch |
| 2001/0012474 A1 | 8/2001 | Gagas |
| 2001/0026049 A1 | 10/2001 | Ichida et al. |
| 2001/0040349 A1 | 11/2001 | Carr |
| 2004/0004327 A1 | 1/2004 | Veiga |
| 2004/0040325 A1 | 3/2004 | Evans |
| 2004/0135322 A1 | 7/2004 | Weisbrodt et al. |
| 2005/0023828 A1 | 2/2005 | Takeuchi et al. |
| 2005/0184513 A1 | 8/2005 | Chisnell |
| 2006/0225781 A1 | 10/2006 | Locher |
| 2007/0045968 A1 | 3/2007 | Long et al. |
| 2007/0089444 A1 | 4/2007 | Chen |
| 2007/0107768 A1 | 5/2007 | Romana et al. |
| 2007/0170886 A1 | 7/2007 | Plishner |
| 2008/0018297 A1 | 1/2008 | Shirai |
| 2008/0265834 A1 | 10/2008 | Lin et al. |
| 2009/0026716 A1 | 1/2009 | Molina, III et al. |
| 2009/0052717 A1 | 2/2009 | Chi |
| 2009/0140689 A1 | 6/2009 | Lee |
| 2009/0179388 A1 | 7/2009 | Uhlenkamp et al. |
| 2010/0009180 A1 | 1/2010 | Bowen et al. |

US 8,523,244 B2

BLOCK FITTING AND SEAL STRUCTURE

CROSS-REFERENCE TO RELATED APPLICATIONS

This application is a continuation of U.S. patent application Ser. No. 12/577,338, filed on Oct. 12, 2009, which in turn is a continuation of U.S. patent application Ser. No. 11/410,685, filed on Apr. 25, 2006. The entire disclosures of the above applications are hereby incorporated herein by reference.

FIELD OF THE INVENTION

The invention relates to a fitting for a vehicle air condition system and more particularly to a fitting for coupling tubing segments, the fitting including a seal structure having a first seal portion and a second seal portion.

BACKGROUND OF THE INVENTION

In assembly line manufacturing of vehicles, it is desirable that line fittings in an air conditioning system can be secured using a power nut driver rather than using a torque wrench. For this reason, peanut or block type fittings are often used.

Various refrigerants such as R12, R134a, and $CO_2$ have been used in the air conditioning system for the vehicle. However, environmental concerns exist. As a result, legislation has been passed by various governmental agencies of the United States and the European Union, for example, requiring that the air conditioning system operate with substantially no refrigerant leaks.

Seal structures having multiple seals have been used to militate against leaks from the fittings used in the air conditioning system. These prior art seal structures have included rubber O-rings and elastomeric seals, for example. However, over time, such seals can degrade. Damage to the seal structure can also occur due to improper installation or handling.

It would be desirable to produce a fitting including a seal structure for use in an air conditioning system which minimizes a leaking of a refrigerant from the air conditioning system.

SUMMARY OF THE INVENTION

Concordant and congruous with the present invention, a fitting including a seal structure for use in an air conditioning system which minimizes a leaking of a refrigerant from the air conditioning system, has surprisingly been discovered.

In one embodiment, the seal structure comprises a first seal portion forming an annular ring including a free edge and formed from a metal material; and a second seal portion extending outwardly from the free edge of said first seal portion.

In another embodiment, the seal structure comprises a first seal portion forming an annular ring including a free edge and formed from a soft metal material; and a second seal portion extending outwardly from the free edge of said first seal portion and formed from an elastomer.

In yet another embodiment, a block fitting comprises a male block portion including a first aperture adapted to receive a tube end therein, said male block portion including an annular shoulder; a female block portion including a first aperture adapted to receive a tube end therein, said female block portion including an annular collar surrounding the first aperture of said female block portion and adapted to abut the annular shoulder formed by said male block portion, the first aperture of said male block portion and the first aperture of said female block portion being substantially concentrically aligned; a first seal portion having a free edge, said first seal portion surrounding the first aperture of said male block portion and the first aperture of said female block portion, wherein said first seal portion provides a primary seal between said male block portion and said female block portion; a second seal portion disposed on the free edge of said first seal portion, wherein the second seal provides a secondary seal between said male block portion and said female block portion; and a fastener adapted to engage said male block portion and said female block portion to sealingly engage said male block portion and said female block portion.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. It is understood that materials other than those described can be used without departing from the scope and spirit of the invention.

Figure 1:
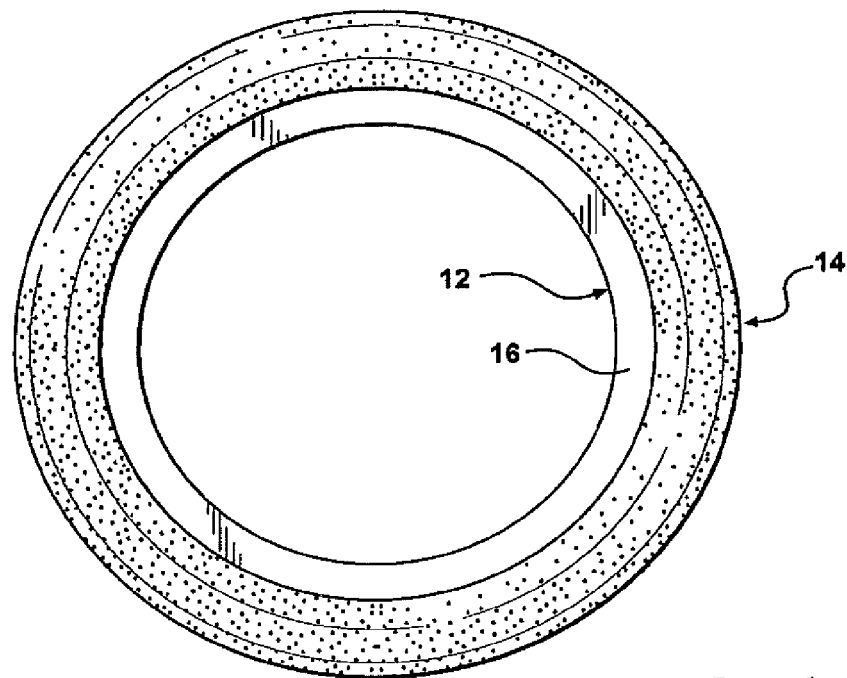
FIG. 1 is a top plan view of a seal structure according to an embodiment of the invention.

FIG. 1 shows a seal structure 10 according to an embodiment of the invention. Although the embodiment shown and described is used for a block type fitting for an air conditioning system, it is understood that the seal structure 10 can be used with other fitting types as desired.

Figure 2:
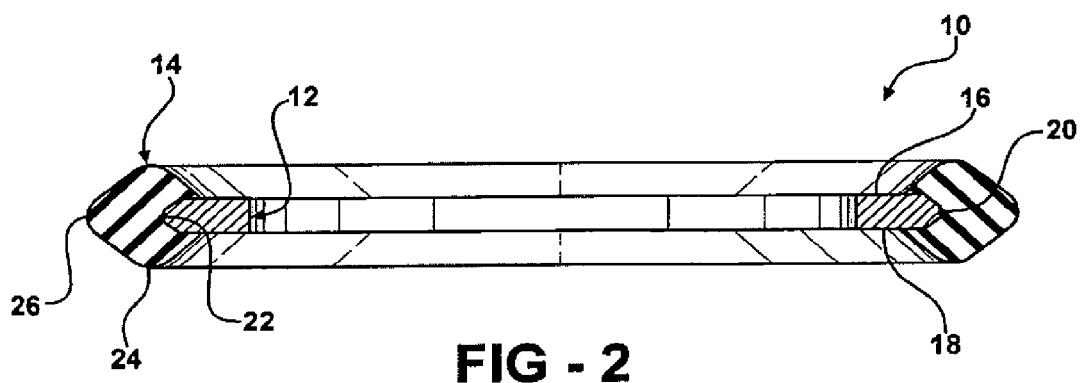
FIG. 2 is a cross-sectional view of the seal structure of FIG. 1 taken along line 2-2.

The seal structure 10 includes a first seal portion 12 and a second seal portion 14. The first seal portion 12 is a substantially flat annular ring. As illustrated in FIG. 2, the ring has a first surface 16 and a second surface 18. An outer free edge 20 of the first seal portion 12 has a chamfer formed thereon. It is understood that the outer free edge 20 can be any shape such as substantially square or rounded, for example. It is further understood that the outer free edge 20 can be continuous or scalloped to facilitate retention of the second seal portion 14 on the first seal portion 12. The cross-sectional shape of the first seal portion 12 is substantially rectangular, although other cross-sectional shapes can be used as desired such as triangular, oval, and other radial curves, for example. It is also understood that channels or grooves can be formed in the first surface 16 and the second surface 18 of the first seal portion 12. In the embodiment shown, the first seal portion 12 is produced from a tin-coated copper, However, it is understood that other conventional materials can be used as desired such as laminated tetrafluoroethylene, rubber-coated aluminum, polyether ether ketone (PEEK), Vespel, pewter, babbit, bronze, nickel, polyimide, aluminum, and other metal coated or rubber-coated metals, for example.

The second seal portion 14 extends radially outwardly from the outer free edge 20 of the first seal portion 12. An annular channel 22 is formed in a radial inner portion 24 of the second seal portion 14. The annular channel 22 is adapted to receive the outer free edge 20 of the first seal portion 12. The second seal portion 14 is fastened to the first seal portion 12 by any conventional fastening means such as vulcanizing, heat welding, press fitting, an adhesive, or a mechanical means of attachment, for example. A radial outer portion 26 extends radially outwardly from the radial inner portion 24. In the embodiment shown, the second seal portion 14 is produced from an elastomer. It is understood that the second seal portion 14 may be produced from any conventional material such as an ethylene propylene diene monomer (EPDM) and hydrogenated acrylonitrile butadiene rubber (HNBR), for example.

Figure 3:
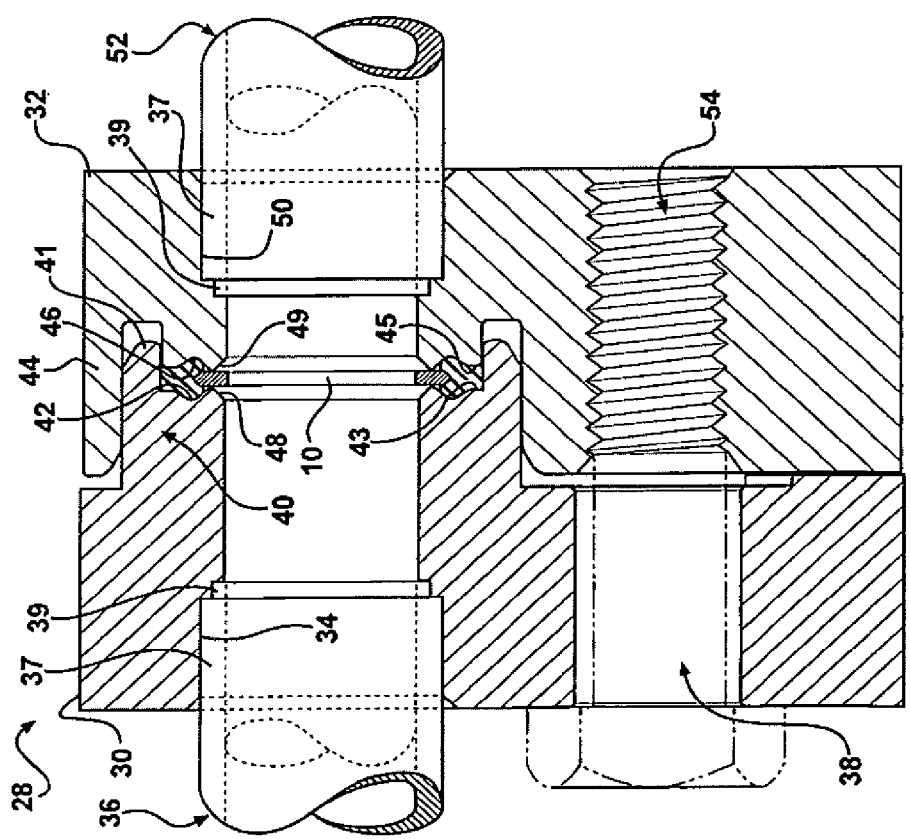
FIG. 3 is a cross-sectional view of a fitting including the seal structure illustrated in FIGS. 1 and 2.

In FIG. 3, the seal structure 10 is shown disposed in a block fitting 28. The block fitting 28 includes a male block portion 30 and a female block portion 32. The male block portion 30 includes a first aperture 34 having a generally circular cross-section, and is adapted to receive a tube or conduit 36. It is desirable, although not critical, to have a clearance fit between the tube 36 and the bore 37 for brazing. The tube 36 can be further joined to the male block portion 30 by any conventional method such as by brazing or welding, for example. It is understood that the male block portion 30 may form a trap 39 for a brazing material (not shown) to militate against the migration of the brazing material towards the annular surfaces 43, 45. The male block portion 30 includes a second aperture 38 adapted to receive a fastener (not shown).

An annular shoulder 40 is formed on a second end of the male block portion 30 and includes an axially extending lip 41 formed at a first end thereof. The lip 41 surrounds an annular surface 43. An annular channel 42 is formed in the annular surface 43. It is understood that a protuberance (not shown) can be formed on the annular surface 43 in place of or in addition to the channel 42. In the embodiment shown, the channel 42 is substantially v-shaped in cross-section. However, it is understood that channels 42 having other shapes can be used as desired. A sealing bead 48 is formed on the annular surface 43 of the male block portion 30 radially inward of the channel 42. Although the sealing bead 48 shown has a v-shaped cross-section, other shapes can be used such as a curved radius, a rectangular, or other shape, for example. Only one sealing bead 48 is shown, however, a plurality of sealing beads 48 can be used if desired, resulting in concentric rings.

The female block portion 32 includes a first aperture 50 having a generally circular cross-section, and is adapted to receive a tube or conduit 52. The tube 52 is joined to the female block portion 32 by any conventional method such as by brazing or welding, for example. It is understood that the female block portion 32 may also form the trap 39 for a brazing material (not shown) to militate against the migration of the brazing material towards the annular surfaces 43, 45. The female block portion 32 includes a second aperture 54 formed therein adapted to receive the fastener.

An annular collar 44 is formed on a second end of the female block portion 32 and surrounds the first aperture 50. An annular surface 45 is formed between the annular collar 44 and the first aperture 50. The annular surface 45 includes an annular channel 46 formed therein. It is understood that a protuberance (not shown) can be formed on the annular surface 45 in place of the channel 46 or in addition to the channel 46. It is understood that channels 46 having cross-sectional shapes other than that shown can be used. A sealing bead 49 is formed on the annular surface 45 radially inward of the channel 46. The sealing bead 49 may have any cross-sectional shape other than that shown, as desired. A plurality of sealing beads 49 can also be used if desired, resulting in concentric rings.

To assemble the block fitting illustrated in FIG. 3, the tube 36 is inserted in the first aperture 34 of the male block portion 30 and secured. The tube 52 is inserted in the first aperture 50 of the female block portion 32 and secured. The seal structure 10 is disposed within the annular lip 41 such that a portion of the second seal portion 14 is disposed on the annular surface 43 of the male block portion 30 and a remainder of the second seal portion 14 is disposed in the channel 42. The seal structure 10 abuts the annular surface 45 of the female block portion 32 such that a portion of the second seal portion 14 is disposed on the annular surface 45 and a remainder of the second seal portion 14 is disposed in the channels 46. The sealing beads 48, 49 abut the first seal portion 12 of the seal structure 10. The male block portion 30 and the female block portion 32 are moved adjacent one another. The fastener is inserted through the second apertures 38, 54 and tightened to sealingly engage the male block portion 30 and the female block portion 32. The sealing beads 48, 49 deform the first seal portion 12 of the seal structure 10 to form a primary seal. The second seal portion 14 of the seal structure 10 creates a secondary seal with the walls of the annular surfaces 43, 45. Once assembled, the male block portion 30 and the female block portion 32 cooperate with the seal structure 10 to form a fluid tight seal, and militate against leakage of a fluid (liquid or gas) from the tubes 36, 52. If an amount of the fluid flowing through the tubes 36, 52 leaks past the primary seal formed by the first seal portion 12 and the sealing beads 48, 49, the second seal portion 14 militates against the leakage of the fluid from the block fitting 28 to the atmosphere. The second seal portion 14 also serves as an environmental seal keeping harmful contaminants away from the first seal portion 10. The second seal portion 14 is also a retainer to keep the seal structure 10 in the male block portion 30 during shipping and handling prior to assembly of the block fitting 28.

Figure 4:
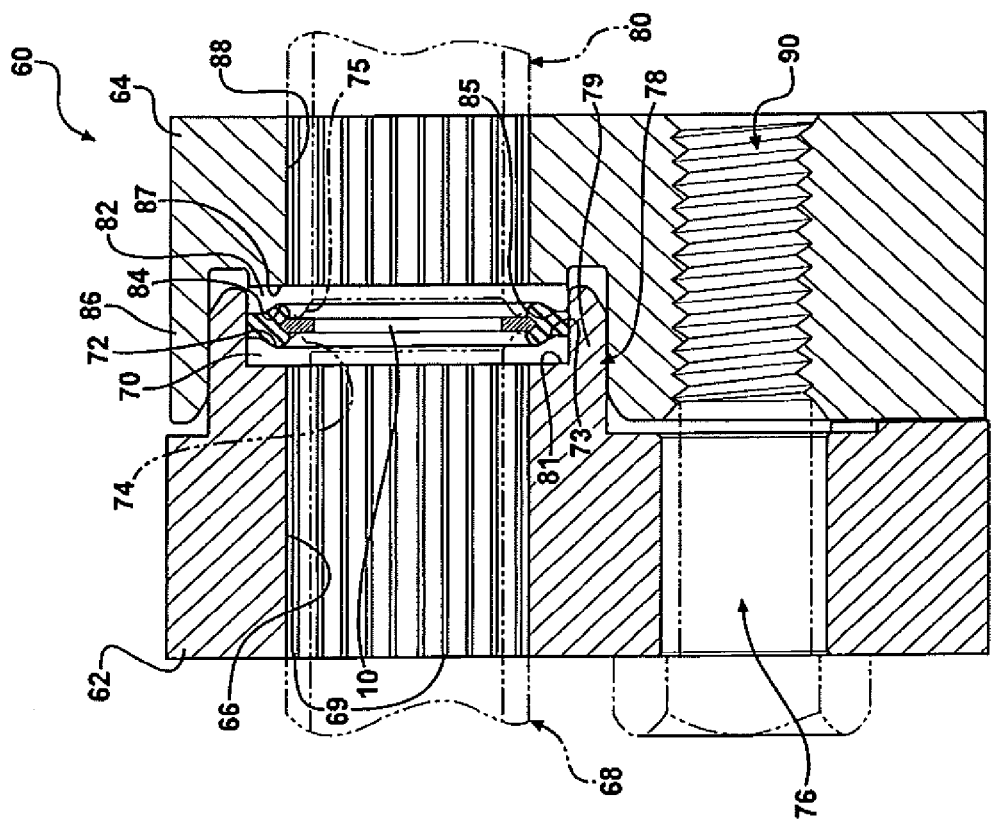
FIG. 4 is a cross-sectional view of a fitting according to another embodiment of the invention including the seal structure illustrated in FIGS. 1 and 2.

FIG. 4 shows a block fitting 60 for use with the seal structure 10 according to another embodiment of the invention. The block fitting 60 includes a male block portion 62 and a female block portion 64. The male block portion 62 includes a first aperture 66 having a generally circular cross-section, and is adapted to receive a tube or conduit 68. It is desirable, although not critical, to have a press fit between the tube 68 and the wall forming the first aperture 66. Splines 69 formed on the wall forming the first aperture 66 can also be used to accomplish the desired interference fit. The tube 68 can be further joined to the male block portion 62 by any conventional method such as by brazing or welding, for example. The male block portion 62 includes a second aperture 76 formed therein adapted to receive a fastener (not shown).

An annular shoulder 78 is formed on the male block portion 62, and includes an axially extending lip 79 formed at a first end thereof. The lip 79 surrounds an annular surface 81. The annular surface 81 is adapted to receive a first end 70 of the tube 68. An annular channel 72 is formed in the first end 70.

It is understood that a protuberance (not shown) can be formed on the first end 70 in place of or in addition to the channel 72. In the embodiment shown, the channel 72 is substantially v-shaped in cross-section. However, it is understood that channels 72 having other shapes can be used as desired. A sealing bead 74 is formed on the first end 70 of the tube 68 radially inward of the channel 72. Although the sealing bead 74 shown has a v-shaped cross-section, other shapes can be used such as a curved radius, a rectangular, or other shape for example. A plurality of sealing beads 74 can also be used if desired, resulting in concentric rings.

The female block portion 64 includes a first aperture 88 having a generally circular cross-section. In the embodiment shown, the first aperture 88 is adapted to receive a tube or conduit 80. It is desirable, although not critical, to have a press fit between the tube 80 and the wall forming the first aperture 88. Splines 69 formed on the wall forming the first aperture 88 can also be used to accomplish the desired interference fit. Also, the tube 80 may be joined to the female block portion 64 by any conventional method such as by brazing or welding, for example. The female block portion 64 includes a second aperture 90 adapted to receive the fastener. An annular collar 86 is formed on a second end of the female block portion 64 to surround the first aperture 88, and includes an annular surface 87. The annular surface 87 is adapted to receive the first end 82 of the tube 80. An annular channel 84 is formed in the first end 82. It is understood that a protuberance (not shown) can be formed on the first end 82 in place of or in addition to the channel 84. In the embodiment shown, the channel 84 is substantially v-shaped in cross-section. However, it is understood that channels 84 having other shapes can be used as desired. A sealing bead 75 is formed on the first end 82 of the tube 80 radially inward of the channel 84. Although the sealing bead 75 shown has a v-shaped cross-section, other shapes can be used such as a curved radius, a rectangular, or other shape for example. A plurality of sealing beads 75 can also be used if desired, resulting in concentric rings.

To assemble the embodiment of the invention illustrated in FIG. 4, the tube 68 is inserted in the first aperture 66 of the male block portion 62 with the first end 70 disposed adjacent and radially inward of the annular shoulder 78. The tube 80 is inserted in the first aperture 88 of the female block portion 64 with the first end 82 disposed adjacent and radially inward of the annular collar 86. The seal structure 10 is disposed between the first end 70 of the tube 68 and the first end 82 of the tube 80. A portion of the second seal portion 14 is received on a surface 73 of the tube 68. A remainder of the second seal portion 14 is received on a surface 85 of the tube 80. The sealing beads 74, 75 abut the first seal portion 12 of the seal structure 10. The male block portion 62 and the female block portion 64 are moved adjacent one another. The fastener is inserted through the second apertures 76, 90 and tightened to sealingly engage the male block portion 62 and the female block portion 64. The sealing beads 74, 75 deform the first seal portion 12 of the seal structure 10 to form a primary seal. The second seal portion 14 of the seal structure 10 forms a secondary seal with the surfaces 73, 85. Once assembled, the first end 70 of the tube 68 and the first end 82 of the tube 80 cooperate with the seal structure 10 to form a fluid tight seal, and militate against leakage of a fluid (liquid or gas) from the tubes 68, 80. If an amount of the fluid flowing through the tubes 68, 80 leaks past the primary seal formed by the first seal portion 12 and the sealing beads 74, 75, the second seal portion 14 militates against leakage of the fluid from the tubes 68, 80 to the atmosphere. The second seal portion 14 also serves as an environmental seal keeping harmful contaminants away from the first seal portion 10. The second seal portion 14 is also a retainer to keep the seal structure 10 in the male block portion 62 during shipping and handling prior to assembly of the block fitting 60.

Figure 5:
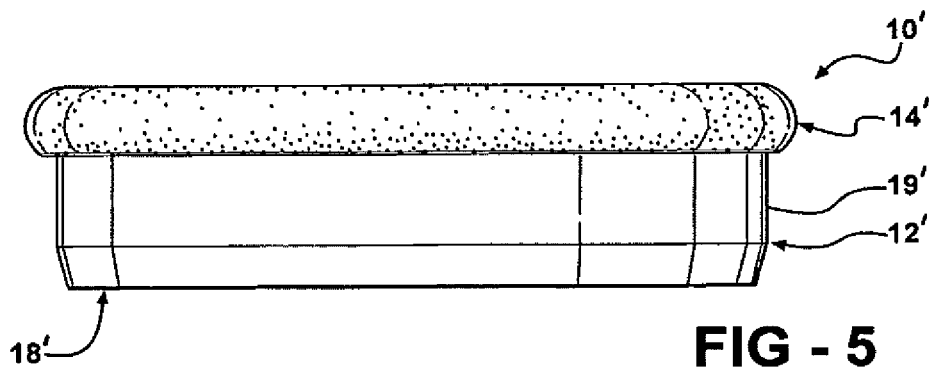
FIG. 5 is a front elevational view of a seal structure according to another embodiment of the invention.
Figure 6:
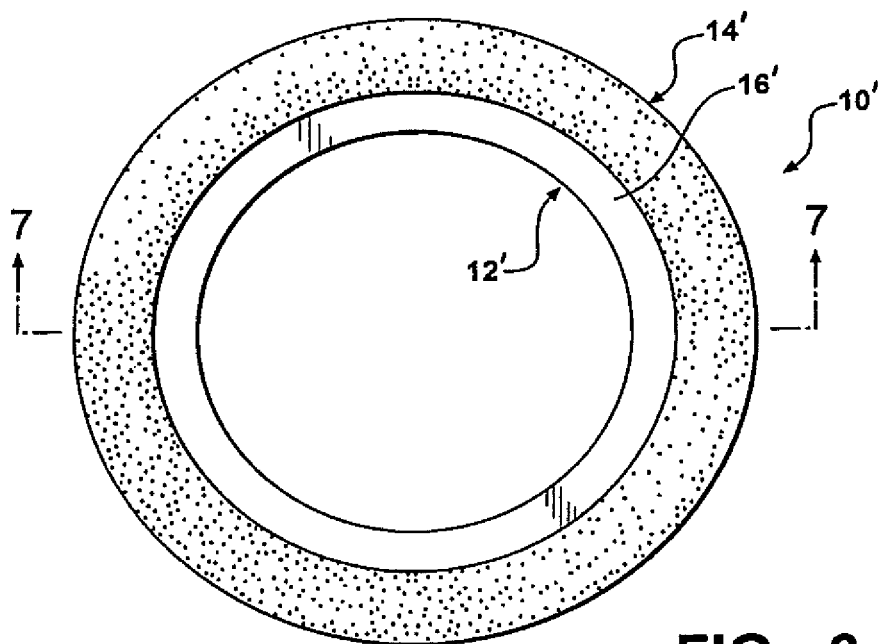
FIG. 6 is a top plan view of the seal structure illustrated in FIG. 6.
Figure 7:
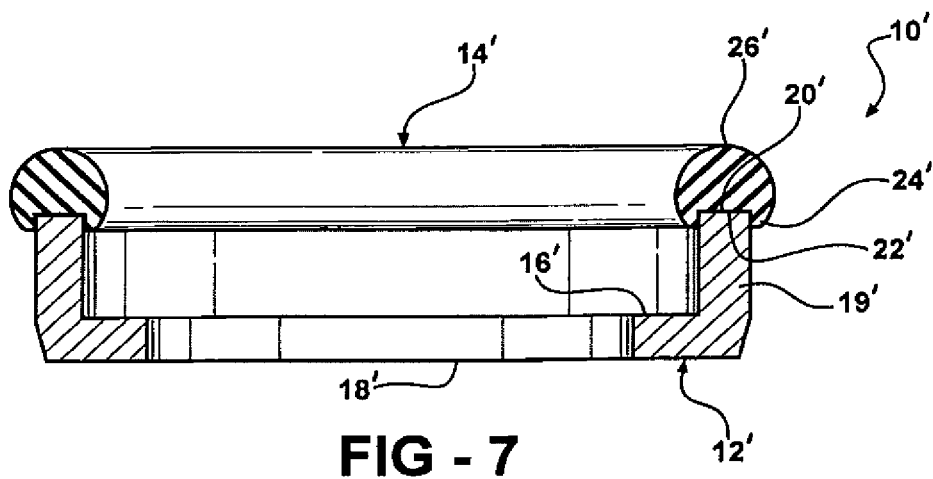
FIG. 7 is a cross-sectional view of the seal structure of FIG. 6 taken along line 7-7.

FIGS. 5 through 7 show a seal structure 10' according to another embodiment of the invention. The seal structure 10' includes a first seal portion 12' and a second seal portion 14'. As shown in FIG. 6, the first seal portion 12' forms an annular ring. As illustrated in FIG. 7, the first seal portion 12' has a first surface 16', a second surface 18', and a flange 19' extending axially from an outer peripheral edge of the first surface 16'. The flange 19' ends at an outer free edge 20'. It is understood that the outer free edge 20' can be any shape such as beveled or substantially square or rounded, for example. It is further understood that the outer free edge 20' can be continuous or scalloped to facilitate retention of the second seal portion 14' on the flange 19'.

The cross-sectional shape of the first seal portion 12' is substantially L-shaped. It is understood that other cross-sectional shapes can be used as desired. It is also understood that channels or grooves can be formed in the first surface 16', the second surface 18', and the flange 19' of the first seal portion 12'. In the embodiment shown, the first seal portion 12' is produced from a tin-coated copper. However, it is understood that other conventional materials can be used as desired such as laminated tetrafluoroethylene, rubber-coated aluminum, polyether ether ketone (PEEK), Vespel, pewter, babbit, bronze, nickel, polyamide, aluminum, and other metal coated or rubber-coated metals, for example.

The second seal portion 14' extends axially outwardly from an outer free edge 20' of the flange 19' of the first seal portion 12'. An annular channel 22' is formed in a first end 24' of the second seal portion 14'. The annular channel 22' is adapted to receive the outer free edge 20' of the flange 19' of the first seal portion 12'. The second seal portion 14' is fastened to the first seal portion 12' by any conventional fastening means such as vulcanizing, heat welding, press fitting, an adhesive, or a mechanical means of attachment, for example. A second end 26' is spaced from the first end 24'. In the embodiment shown, the second seal portion 14' is produced from an elastomer. It is understood that the second seal portion 14' may be produced from any conventional material such as an ethylene propylene diene monomer (EPDM) or a hydrogenated acrylonitrile butadiene rubber (HNBR), for example.

Figure 8:
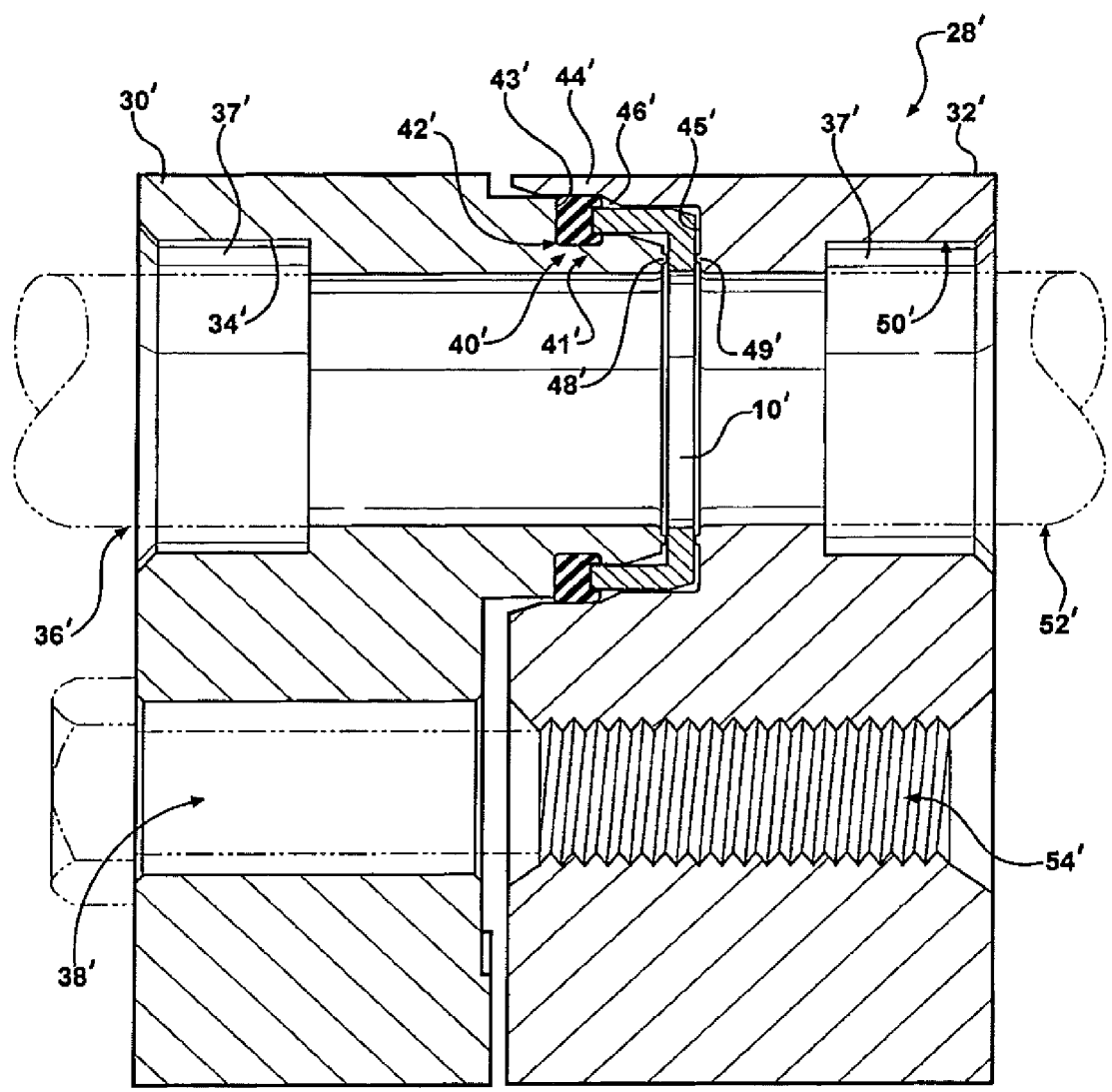
FIG. 8 is a cross-sectional view of a fitting including the seal structure illustrated in FIGS. 5, 6, and 7.

In FIG. 8, the seal structure 10' is shown disposed in a block fitting 28'. The block fitting 28' includes a male block portion 30' and a female block portion 32'. The male block portion 30' includes a first aperture 34' having a generally circular cross-section, and is adapted to receive a conduit or tube 36'. It is desirable, although not critical, to have a clearance fit between the tube 36' and the bore 37' for brazing. Splines (not shown) formed on the wall forming the first aperture 34' can be used to accomplish the desired interference fit. The tube 36' can further be joined to the male block portion 30' by any conventional method such as by brazing or welding, for example. The male block portion 30' includes a second aperture 38' formed therein adapted to receive a fastener (not shown).

An annular shoulder 40' is formed on a second end of the male block portion 30' and includes an axially extending lip 41' formed at a first end thereof. An annular channel 42' is formed in an outer wall of the lip 41'. It is understood that a protuberance (not shown) can be formed on the outer wall of the lip 41' in place of or in addition to the channel 42'. In the embodiment shown, the channel 42' is substantially rectangular in cross-section. However, it is understood that channels 42' having other shapes can be used as desired. A sealing bead 48' is formed on the lip 41' of the male block portion 30'.

Although the sealing bead 48' shown has a v-shaped cross-section, other shapes can be used such as a curved radius, a rectangular, or other shape, for example. Only one sealing bead 48' is shown, however, more sealing beads 48' can be used if desired, resulting in concentric rings.

The female block portion 32' includes a first aperture 50' having a generally circular cross-section, and is adapted to receive a conduit or tube 52'. The tube 52' is joined to the female block portion 32' by any conventional method such as by brazing or welding, for example. It is desirable, although not critical, to have a clearance fit between the tube 52' and the bore 37' for brazing. The female block portion 32' includes a second aperture 54' formed therein adapted to receive the fastener.

An annular collar 44' is formed on a second end of the female block portion 32' and surrounds the first aperture 50'. The annular collar 44' forms an annular channel 46' therein. An annular surface 45' is formed between the annular collar 44' and the first aperture 50'. It is understood that a protuberance (not shown) can be formed on the inner wall of the annular collar 44' in place of the channel 46' or in addition to the channel 46'. It is understood that the channel 46' may have any cross-sectional shape other than that shown. A sealing bead 49' is formed on the annular surface 45' radially inward of the annular collar 44'. The sealing bead 49' may have any cross-sectional shape other than that shown, as desired. Additional sealing beads 49' can also be used if desired, resulting in concentric rings.

To assemble the block fitting illustrated in FIG. 8, the tube 36' is inserted in the first aperture 34' of the male block portion 30'. The tube 52' is inserted in the first aperture 50' of the female block portion 32'. The seal structure 10' is disposed over the annular shoulder 40' of the male block portion 30' and is positioned to allow the flange 19' of the seal structure 10' to abut the outer wall of the annular shoulder 40' of the male block portion 30' and the inner wall of the annular collar 44'. The male block portion 30' and the female block portion 32' are moved adjacent one another. A portion of the second seal portion 14' is received in the channel 46' of the female block portion 32'. A remaining portion of the second seal portion 14' is received in the channel 42' of the male block portion 30'. The flange 19' abuts the lip 41' of the male block portion 30'. The sealing beads 48', 49' abut the first seal portion 12' of the seal structure. The fastener is inserted through the second apertures 38', 54' and tightened to sealingly engage the male block portion 30' and the female block portion 32'. The sealing beads 48', 49' deform the first seal portion 12' of the seal structure 10' to form a primary seal. The second seal portion 14' of the seal structure 10' creates a secondary seal with the walls of the channels 42', 46'. Once assembled, the male block portion 30' and the female block portion 32' cooperate with the seal structure 10' to form a fluid tight seal, and militate against leakage of a fluid (liquid or gas) from the tubes 36', 52'. If an amount of the fluid flowing through the tubes 36', 52' leaks past the primary seal formed by the first seal portion 12' and the sealing beads 48', 49', the second seal portion 14' militates against the leakage of the fluid from the block fitting 28' to the atmosphere. The second seal portion 14' also serves as an environmental seal keeping harmful contaminants away from the first seal portion 10'. The second seal portion 14' is also a retainer to keep the seal structure 10' in the male block portion 30' during shipping and handling prior to assembly of the block fitting 28'.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A block fitting for an air conditioning system comprising:
    a male block portion including a first aperture for receiving a tube end therein, the male block portion including an annular shoulder surrounding the first aperture of the male block portion, the annular shoulder including an axially extending lip formed at a first end thereof;
    a seal structure disposed radially inward from the axially extending lip of the male block portion and adjacent the male block portion, the seal structure including an annular first seal portion produced from a soft metal or plastic material and having a free edge, and a second seal portion produced from an elastomer disposed on the free edge of the first seal portion; and
    a fastener to sealingly engage the male block portion with a female block portion, the female block portion including a first aperture for receiving a tube end therein, the female block portion including an annular collar surrounding the first aperture of the female block portion and adapted to cooperate with the annular shoulder formed by the male block portion, the first aperture of the male block portion and the first aperture of the female block portion adapted to be substantially concentrically aligned,
    wherein the fastener causes the male block portion and the female block portion to deform the first seal portion and provide a primary seal between the male block portion and the female block portion, and the fastener causes the male block portion and the female block portion to cooperate with the second seal portion to provide a secondary seal between the male block portion and the female block portion.

2. The block fitting of claim 1, wherein the first seal portion is substantially flat and the second seal portion extends radially outwardly therefrom.

3. The block fitting of claim 2, wherein the free edge of the first seal portion is disposed in an annular channel formed in a radial inner portion of the second seal portion.

4. The block fitting of claim 3, wherein the second seal portion has a first rounded lobe disposed opposite of the annular channel, a second rounded lobe disposed adjacent a first surface of the first seal portion, and a third rounded load disposed adjacent a second surface of the first seal portion.

5. The block fitting of claim 4, wherein the outer free edge has a chamfer formed thereon.

6. The block fitting of claim 5, wherein the chamfer formed on the free edge of the first seal portion includes a first chamfer surface extending laterally inwardly from a first surface of the first seal portion and a second chamfer surface extending laterally inwardly from a second surface of the first seal portion, the first chamfer surface and the second chamfer surface connected by a third chamfer surface forming a blunt end of the free edge.

7. The block fitting of claim 6, wherein the annular channel of the second seal portion substantially conforms to a shape of the chamfer of the first seal portion.

8. The block fitting of claim 1, wherein the second seal portion is attached to the free edge of the first seal portion by one of vulcanizing, press fitting, heat welding, a mechanical means, and an adhesive.

9. The block fitting of claim 1, wherein the first seal portion includes a flange extending axially from a first surface thereof, the free edge of the first seal portion formed on the flange.

10. The block fitting of claim 1, wherein the second seal portion is an elastomer.

11. The block fitting of claim 10, wherein the elastomer is one of an ethylene propylene diene monomer (EPDM), and a hydrogenated actylonitrile butadiene rubber (HNBR).

12. The block fitting of claim 1, wherein the first seal portion is formed from one of tin-coated copper, laminated tetrafluoroethylene, rubber-coated aluminum, polyether ether ketone, polyimide-based polymer, pewter, Babbit metal, bronze, nickel, polyamide, and aluminum.

13. The block fitting of claim 12, wherein the first seal portion is tin-coated copper.

14. A block fitting for an air conditioning system comprising:
a female block portion including a first aperture for receiving a tube end therein, the female block portion including an annular collar surrounding the first aperture of the female block portion;
a seal structure disposed radially inward from the annular collar of the female block portion and adjacent the female block portion, the seal structure including an annular first seal portion produced from a soft metal or plastic material and having a free edge, and a second seal portion produced from an elastomer disposed on the free edge of the first seal portion; and
a fastener to sealingly engage the female block portion with a male block portion, the male block portion including a first aperture for receiving a tube end therein, the male block portion including an annular shoulder surrounding the first aperture of the male block portion and adapted to cooperate with the annular collar formed by the female block portion, the annular shoulder including an axially extending lip formed at a first end thereof, the seal structure adapted to be disposed radially inward from the axially extending lip, the first aperture of the female block portion and the first aperture of the male block portion adapted to be substantially concentrically aligned,
wherein the fastener causes the female block portion and the male block portion to deform the first seal portion and provide a primary seal between the female block portion and the male block portion, and the fastener causes the female block portion and the male block portion to cooperate with the second seal portion to provide a secondary seal between the female block portion and the male block portion.

15. The block fitting of claim 14, wherein the first seal portion is substantially flat and the second seal portion extends radially outwardly therefrom.

16. The block fitting of claim 15, wherein the free edge of the first seal portion is disposed in an annular channel formed in a radial inner portion of the second seal portion.

17. The block fitting of claim 16, wherein the second seal portion has a first rounded lobe disposed opposite of the annular channel, a second rounded lobe disposed adjacent a first surface of the first seal portion, and a third rounded load disposed adjacent a second surface of the first seal portion.

18. The block fitting of claim 17, wherein the outer free edge has a chamfer formed thereon.

19. The block fitting of claim 18, wherein the chamfer formed on the free edge of the first seal portion includes a first chamfer surface extending laterally inwardly from a first surface of the first seal portion and a second chamfer surface extending laterally inwardly from a second surface of the first seal portion, the first chamfer surface and the second chamfer surface connected by a third chamfer surface forming a blunt end of the free edge.

20. The block fitting of claim 19, wherein the annular channel of the second seal portion substantially conforms to a shape of the chamfer of the first seal portion.

\* \* \* \* \*